Feb. 25, 1969         E. W. HINES         3,429,155
POSITIONING CONTROL SYSTEM
Filed Jan. 12, 1966                    Sheet 1 of 2

INVENTOR.
EUGENE W. HINES

BY

ATTORNEY

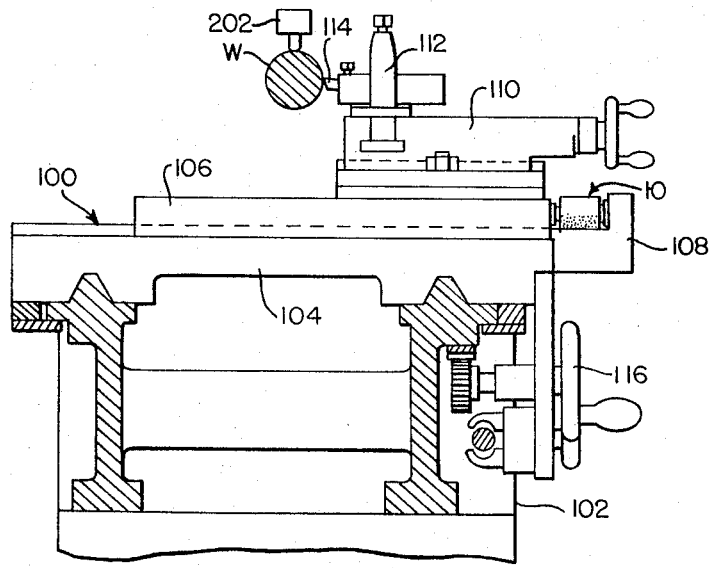
FIG. 5
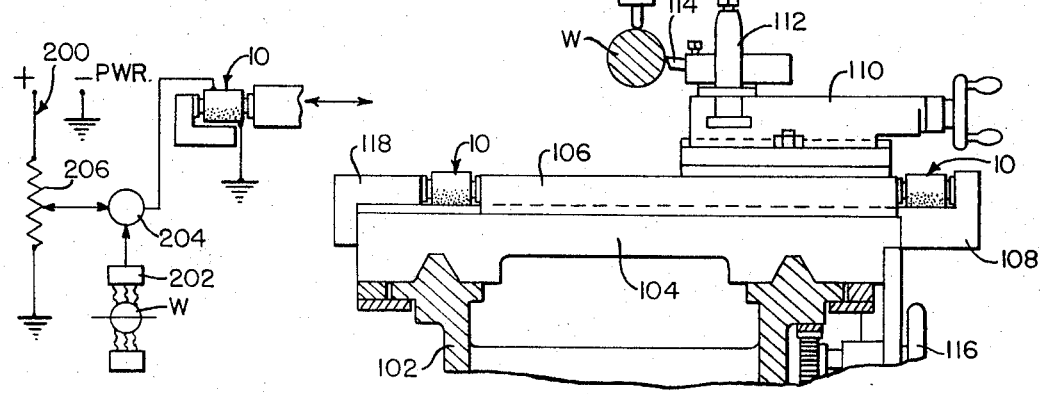
FIG. 9
FIG. 6
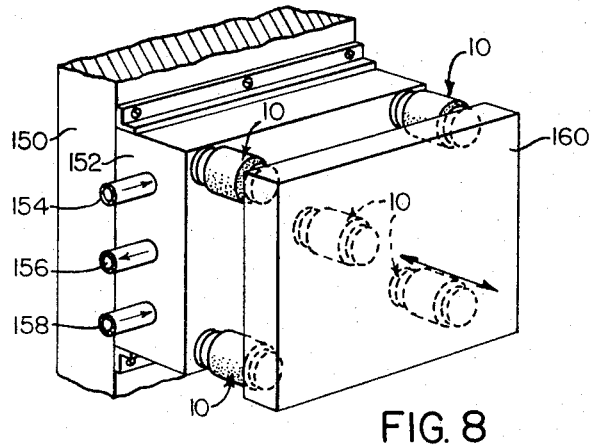
FIG. 8
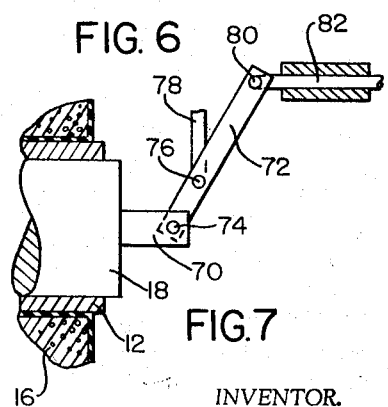
FIG. 7
INVENTOR.
EUGENE W. HINES
BY
ATTORNEY

United States Patent Office 3,429,155
Patented Feb. 25, 1969

3,429,155
POSITIONING CONTROL SYSTEM
Eugene W. Hines, Grand Blanc, Mich., assignor to
E. W. Hines Associates
Filed Jan. 12, 1966, Ser. No. 520,113
U.S. Cl. 72—9           2 Claims
Int. Cl. B21b 37/12, 37/02; B21j 15/24

ABSTRACT OF THE DISCLOSURE

A positioning control system in which a single metallic core or bar of a magnetostrictive device is effectively and operatively associated with an element required to be moved in response to a flow of electric current metered or controlled through a gaging or control device. One end of the bar is secured against movement while the other end is free to move in response to the magnetostrictive effect generated by the current flow. The device may also include, in another preferred embodiment, an encircled mass of die rubber which is functionally responsive to the movement of the metallic bar and translates such movement to the element required to be moved.

---

This invention relates to a positioning control system, and more particularly to such a control system embodying a magnetostrictive transducer.

This invention involves the use of a magnetostrictive device served with a flow of direct current, or its substantial equivalent, in conjunction and association with a machine or a device for the accurate, precise and substantially infinitely variable control of the movement of an element, member, material or substance by the device. The magnetostrictive device is operably responsive to a controlled flow of current responding to the operation of a sensor, metering or other measuring device indicating through a detector the desired or required direction and magnitude of movement so that the positioning control is effective to move an element, member, material or substance in such direction the required or desired amount.

The magnetostrictive device comprises generally a current-carrying coil surrounding a core bar of a single highly magnetizable material, one end of the bar being fixed so that movement of the bar is restricted in the direction of the support, the other end of the bar being free for constriction upon an input of current to the coil and for relaxing toward its normal or unstrained length upon a cessation of such current to the coil. The constriction of the bar is directly proportional to the amount of current introduced to the coil.

Although a pure source of direct current will provide greater efficiencies in operation of the magnetostrictive transducer, it is believed that a highly rectified alternating current, as by solid state components or full wave rectifiers, may also be used to energize the device for an efficient operation of the positioning control. Direct current can be controlled by devices such as rheostats for an infinitely variable flow of such current to the magnetostrictive coil, and such current is non-pulsating. Therefore, the constriction of the core bar within the coil is non-vibratory. With fully rectified alternating current, the current input to the coil may be very slightly pulsating, and the magnitude of such pulsation in terms of the core bar vibration may or may not be acceptable, depending upon the tolerance of positioning control which is permissible in any particular application.

When current is applied to or varied in the magnetostrictive coil the response in the centered core bar is immediate and infinitely controlled without lag. Thus, when the free end of the bar is direct connected or linkage connected to an element or member or material or substance to be moved, such movement is effective practically simultaneously with a variation of current flow to the coil. In addition to direct connection of the magnetostrictive core bar to an element, member, material or substance, the connection may also be by a mechanical leverage or linkage whereby the movement of the core bar is amplified, multiplied or divided; or, by a reduction or increase in areas of effective force with respect to an area or areas of applied force, the effective output movement of an element can also be multiplied or divided.

The positioning control circuitry for feeding and/or varying the direct current to the magnetostrictive coil may be of any conventional type embodying a sensing, gaging, or measuring device providing a signal to a detector device which receives a predetermined pre-set signal and modulates an output signal having a value equal to the algebraic difference of the two input signals. The output signal then passes to the magnetostrictive transducer which responds according to the positive or negative value of the signal.

The circuitry and the magnetostirctive transducer device provide means for positioning control of a member in many different types of equipment requiring precision control. Among the types of equipment to which the control system of this invention is readily adaptable are rolling mills, lathes, drills, grinders, boring mills and other forms of machine tools, all forms of presses, coining equipment, shears, brakes, servoing means for all types of inertial guidance systems, equipment for the opening and closing of lenses and other apertures under sensing control of suitably relayed intelligence, equipment for the exertion or relaxation of pressure on any substance or material under the directive of controlled intelligence, and in weighing or metering equipment used with solids or fluids. The positioning control system of this invention can also be utilized for the corrective positioning of any device, machine or complement thereof where an infinitely variable control and accuracy of such positioning is a requisite, as a positioning and corrective navigational means for the operation of manned or unmanned (drove) vehicles or devices above, at or below sea level, for the fine tuning or calibration of precision instruments and scientific equipment, for the fine and accurate control and/or calibration of the flow of fluid substances or materials, as a means of creating accurate pressures on thermoelectric generating material such as crystals so as to induce from such substances an accurate, reproducible and controlled electromotive force (EMF) output, for the dispensing of accurately controlled amounts of fluids or solids, as a means for accurately controlling the temperatures of furnaces, ovens and like devices, and for the infinitely variable control of the movement in any specified direction of a substance or material being acted upon by a device or machine in which or with which the positioning control device and system of this invention is associated as a control component.

Since there are many electrical and electronic devices readily available at this time for infinitely varying the input of electric current to the magnetostrictive device, the output effort and effect of the magnetostrictive device is thereby rendered infinitely variable. In addition, the lag time of such output effect with respect to the input of current is substantially zero. By such means, positioning control of a tool, roll, or other machine or device element becomes very precise and accurate and responsive, in terms of time as well as in terms of magnitude, and substantially coincident with the requirement of the device or machine with which the magnetostrictive device is associated or connected.

It is an object of the invention to provide a very precise, accurate and rapidly responsive positioning control system utilizing a magnetostrictive transducer device. Another object is to employ a non-pulsating direct current to the magnetostrictive device so as to produce a non-vibratory output from such device. Another object is to employ a fully rectified alternating current of very low pulsation to the magnetostrictive device so as to produce an output of movement having a very low fluctuation of acceptable tolerance. Yet another object is to provide a very rapidly responsive positioning control system in which a magnetostrictive device is employed having a substantially zero time lag response to a sensing device. Still another object is to provide a rapidly responsive positioning control system employing a magnetostrictive device for the accurate and precise movement of an element, member, material or substance.

These and additional objects of the invention and features of construction will become more clearly apparent from the description submitted below, in which the terms employed are words of description and not of limitation.

Reference is here made to the drawings annexed hereto and forming an integral part of this specification and in which FIGURE 1 is a sectional view of a magnetostrictive device direct connected to a member in which movement is required or desired.

FIGURE 2 is a sectional view similar to FIGURE 1 showing the magnetostrictive device arranged for a multiplication of the effective output pressure to the movable member.

FIGURES 3 and 4 are sectional views taken substantially on the lines 3—3 and 4—4 of FIGURE 2.

FIGURES 5 and 6 are vertical, substantially elevational views of a machine tool, lathe, employing one of the magnetostrictive devices (FIGURE 5), or two of such devices (FIGURE 6), for the precise and accurate positioning control of the tool bit with respect to the workpiece.

FIGURE 7 is a fragmentary elevational view partly in section of a magnetostrictive device in combination with a linkage for the multiplication of the output effect generated by the magnetostrictive core bar.

FIGURE 8 is an elevational view of the magnetostrictive device in combination with an auxiliary member for the amplification of the output effect.

FIGURE 9 is a schematic wiring diagram of a circuit for signalling and adjustment in the positioning control of the magnetostrictive core bar.

Figure 1:
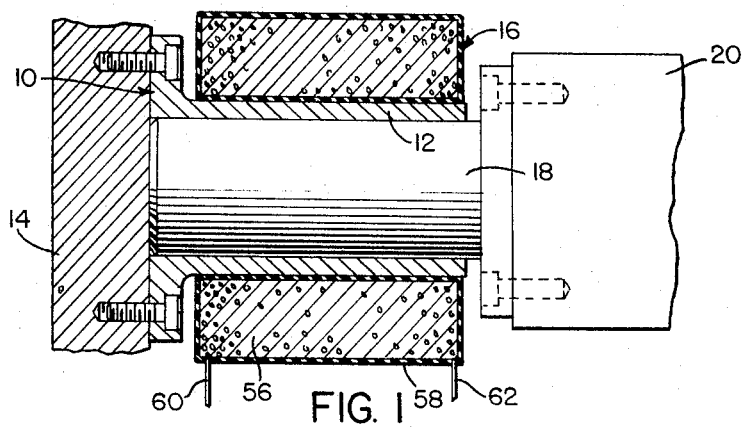

The principle of magnetostriction is defined as the change in dimensions of a body when subjected to a magnetic field. In various ferromagnetic materials, the longitudinal and transverse changes in dimension are either positive (extensions) or negative (contractions). Generally, in any given field, the transverse effect is opposite in sign to the longitudinal effect and about half in magnitude. The magnetostrictive device herein described is in effect a magnetostrictive transducer, which converts electromagnetic energy to mechanical energy.

As shown in the several views of the drawings and particularly in FIGURES 1, 5, 6, and 8, the magnetostrictive transducer 10 comprises a cylinder shell 12 secured to a support 14, a coil 16 surrounding the shell 12, and a core bare 18 of a single highly magnetizable material movable within the shell and direct connected to a member 20 which is to be moved, in this instance, in a direction substantially parallel with the axis of the core bar.

Figure 2:
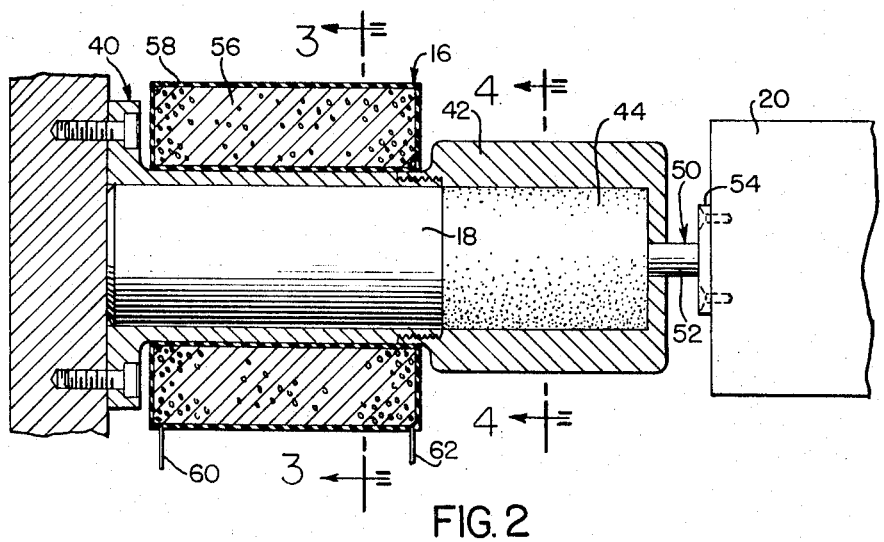
Figure 3:
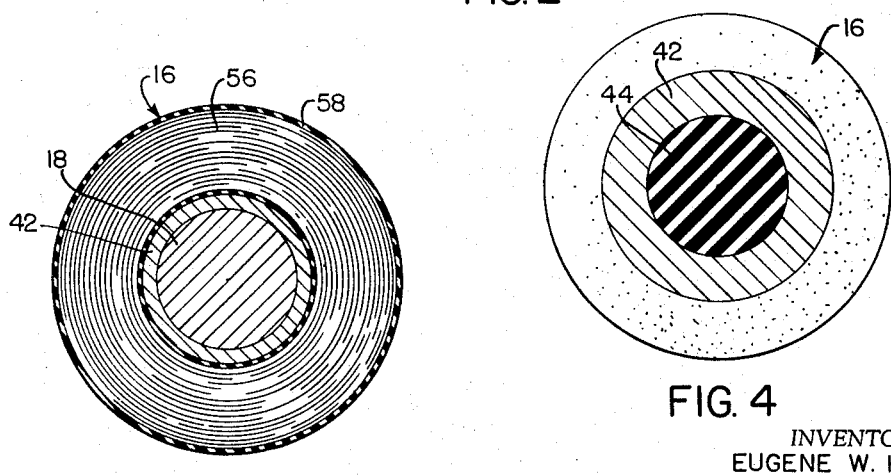
Figure 4:
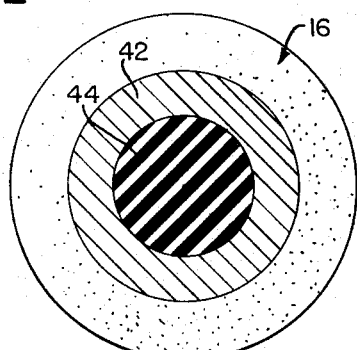

A modification of the transducer 10 is a magnetostrictive device 40, shown in FIGURE 2, in which the cylinder shell 42 is extended outwardly to provide space for the cylinder 44 of the die rubber (about 60 durometer) which is aligned with the core bar 18 and functions substantially as a hydraulic solid against the pin 50 whose stem 52 is secured by a collar 54 to the member 20 which is to be moved.

As shown in FIGURES 1 and 2, the coil 16 is formed of electrically conductive wire 56 arranged in conventional insulated coil form 58 about the shell 12 or 42, and is provided with leads 60 and 62 for connection to a source of signal current as shown in FIGURE 9. As current is fed to the coil, the core bar 18 is caused to constrict longitudinally, the longitudinal effect becoming increasingly more negative and the transverse effect increasingly more positive with increasing magnetic field strength. Therefore, an allowable tolerance in the cylinder 12 or 42 must be made to accommodate such transverse and longitudinal dimensional changes.

To multiply the output effect of the longitudinal constriction at the point of applied force, the magnitude of the constriction may be multiplied for example by a linkage system connected to the core bar 18. An example of one such amplification system is that shown fragmentarily in FIGURE 7, wherein the core bar 18 is provided at its operating end with a yoke 70, a lever 72 being pin connected at 74 to the yoke and pivoted at 76 by a pin supported in the member 78, the other end of the lever 72 being pin connected at 80 to a member 82 which is to be moved. One or more such levers may be used to multiply or divide the effective movement at the yoke 70. The pivots and pins should have a medium or high interference fit to remove all play at such connections, in order to provide a maximum of positioning control at the effective output end of the system.

Referring to FIGURES 5 and 6, examples are given of applications of the invention utilizing a magnetostrictive transducer 10 to provide precise and accurate positioning control to a lathe tool bit. In FIGURE 5 is illustrated a lathe having a single magnetostrictive transducer 10, and in FIGURE 6 two such transducers.

Referring to these figures, the lathe 100 has a frame 102, a saddle 104, across-slide 106 supported on the saddle, a bracket 108 fixedly mounted on the saddle and to which the transducer 10 is fixedly secured, a slide rest 110 supporting the tool holder 112, a tool bit 114, and a wheeled drive 116 to move the saddle longitudinally of the frame 102. The work W is supported in any conventional manner in the lathe work supports and a gage or sensor 202 is arranged about or at the work W to sense the dimension being cut by the tool bit 114 as machining progresses.

The magnetostrictive transducer 10 is connected on one side to the bracket 108 and on its other end to the cross-slide 106 which is free to move upon the saddle 104. Thus, when the core bar 18 of the transducer 10 is caused to constrict or to relax, the cross-slide carrying the tool bit 114 is moved and moves the latter to cut further out of or into the work W.

In FIGURE 6, two of the transducers 10 are secured to brackets 108 and 118 to produce an amplified motion in the cross-slide, when the core bar of one transducer is constricted and the core bar of the second transducer is relaxed, or a divided motion in the cross-slide, when both core bars 18 are constricted or relaxed, but one more than the other.

One of the electrical circuits which can be used for serving the transducer 10 is that shown generally and schematically in FIGURE 9. It will be understood that the circuit may be modified, changed or varied in any particular so as to provide sensing sufficient to signal a requirement for motion in the core bar 18. The circuit 200 shown, which is a very simple one, comprises a sensing device 202, which may be a contact gage, an air gage, an X-ray gage, or other signal producing sensor, an error detector circuit unit 204, and a potentiometer 206. The potentiometer signal is pre-set to be equal to a signal which the sensor 202 would send when the dimension, for example, being sensed is of the desired value.

Upon receiving the signals of the sensor 202 and the potentiometer 206, the detector 204 produces an output signal to the transducer 10 which is the algebraic difference between the value of the pre-set signal at the potentiometer 206 and the value of the signal emitted by the sensor 202. These devices, so far as can be provided, are preferably made of or with solid state components in order to obtain the most efficient performance in the circuitry.

As an example of how the circuit operates, if the preset signal is 10 milliamperes and the sensor signal is 12 milliamperes, the output signal from the detector 204 to the magnetostrictive transducer would be plus 2 milliamperes, which would cause a contraction or constriction of the core bar 18 and a consequent drawing back of the tool bit in the lathe.

Should the sensor signal, however, be lower in value than the pre-set signal, the output signal from the detector would have a minus value and the core bar would be caused, by a reduced input of current to coil 16, to elongate or be less constricted, and thus advance the tool bit into the workpiece. If the pre-set and sensor signals are equal in value, then the detector signal is zero and no change occurs in the core bar 18.

It would appear therefore to be a preferred method of operating the positioning control of this invention to place the core bar 18 at the inception of control under at least a partial magnetostrictive strain so that axial movement of the core bar in either direction will effect a consequent movement of the element, member, substance or material which it is desired to be moved. Thereafter, as current is passed into the coil 16 for further constriction of the core bar 18, the member 20, or similar member, to which the core bar is connected or associated is moved toward the transducer 10 or is moved away from it, depending upon the sign and magnitude of the signal generated at the error detector unit 204.

The positioning control effected by the inventive combination is a substantially infinitely variable type of control to produce the required effect. It would appear that in addition to the applications described and referred to above the positioning control system herein described could also be particularly suitable for use in and with tape controlled equipment, where a substantial amount of precision control is normally required.

Another representative application or example of the magnetostrictive positioning control of this invention is that illustrated in FIGURE 8, in which a support member 150 is arranged with a block 152 secured thereto through which cold and/or hot fluids can be passed by means of the conduits 154, 156 and 158 for heating and/or cooling the block so as to obtain a purely thermal expansion or contraction effect. Reference should be made in connection with this block structure to the disclosure in Hautau Patent No. 3,201,962, wherein the thermal expansion-contraction effect is utilized to control the position of rolls in a strip rolling mill. However, the lag time of such effect is so great before a change in dimension is generated at the rolls that the usefulness or efficiency of the combination disclosed in the patent appears to be relatively limited. In the combination utilizing magnetostrictive transducers, as illustrated and described herein, the lag time between the sensor signalling a desired change in the position of the operating element or member and its effective response is substantially zero. In FIGURE 8, the fluid block 152 provides a gross expansion control while the transducers 10 provide the fine, precision control of the core bars imparting motion to the member 160 secured thereto, in one direction or another.

Although it is preferred to operate the positioning control system by initially placing the core bar 18 under partial or substantially full magnetostrictive strain, it is also to be understood that the control system of this invention can be operated without any such pre-striction.

A ferromagnetic core bar 18 of high nickel alloy, 18% or higher, is a preferred core bar material in the magnetostrictive transducer. It is understood that certain exotic ceramic compositions also exhibit properties of magnetostriction in similar devices, and where feasible and practical the invention can embody such core bar materials as well.

Where extreme ambient temperatures are present, the magnetostrictive transducer should be encapsulated or shielded from the interfering effects of such temperatures by enclosing the transducer, except for the output end, in a housing in which the coil 16 and core bar 18 are substantially insulated. The operative end of the core bar can then extend through a suitable seal in the housing.

It is to be understood that although most materials exhibit a constrictive effect upon application of the magnetic field, some materials elongate or extend under the influence of a magnetic field, and such effect is also considered to come within the compass of the invention. In addition, reversal of polarity of the applied current would normally result in no change of the magnetostrictive effect.

Having described the invention in its simplest terms, it is to be understood that the features of construction and circuitry may be changed or varied in greater or lesser degree, without departing from the essence of the invention defined in the appended claims.

I claim:
1. In a positioning control system including a movable element to which controlled movement is to be imparted,
 a magnetostrictive transducer for imparting said movement to said element,
 said transducer having a magnetostrictive core member of a single highly magnetizable material responsive to a magnetic field induced therein,
 a housing for said core member and said mass of resilient material,
 a mass of solid resilient relatively incompressible material in said housing contiguous with said core member, said housing for said core member and said mass of resilient material accommodating the magnetostriction of said core member,
 a movable member having a portion thereof projecting into said housing and in contact with said resilient material and a portion disposed exteriorly of said housing for effective output movement responsive to the magnetostrictive movement of said core member,
   said core member being conjunctively associated through said resilient material with said movable element, whereby said controlled movement is imparted to said element upon an application of electric current to said transducer.
2. The structure defined in claim 1, wherein
 the cross-sectional area of said movable member at said resilient material being less than the cross-sectional area of said core member in contact with said resilient material,
   whereby the output pressure of said core member is multiplied at and by said movable member.

References Cited

UNITED STATES PATENTS

| 2,437,270 | 3/1948 | Peek | 310—26 |
| 2,907,937 | 10/1959 | Apgar | 318—28 |
| 3,037,156 | 5/1962 | Koulikovitch | 318—118 |
| 3,201,962 | 8/1965 | Hautau | 72—9 |

CHARLES W. LANHAM, *Primary Examiner.*

G. P. CROSBY, *Assistant Examiner.*

U.S. Cl. X.R.

72—16, 430; 90—62; 82—2; 335—3; 318—22, 118; 310—26